United States Patent [19]

Deville et al.

[11] Patent Number: 5,628,972

[45] Date of Patent: May 13, 1997

[54] PROCESS FOR REMOVING IRON IN SODIUM ALUMINATE LIQUORS OBTAINED FROM ALKALINE ATTACK OF BAUXITE CONTAINING ALUMINA MONOHYDRATE

[75] Inventors: Jean Deville, Aix-en-Provence; Jean-Michel Lamerant, Bouc Bel Air, both of France

[73] Assignee: Aluminium Pechiney, Courbevoie, France

[21] Appl. No.: 571,470

[22] Filed: Dec. 13, 1995

[30] Foreign Application Priority Data

Dec. 22, 1994 [FR] France .................... 94 15727

[51] Int. Cl.$^6$ .................... C01F 1/00
[52] U.S. Cl. .................... 423/121
[58] Field of Search .................... 423/121

[56] References Cited

U.S. PATENT DOCUMENTS

| | | | |
|---|---|---|---|
| 3,796,789 | 3/1974 | Adams .................... | 423/122 |
| 3,966,874 | 6/1976 | Featherston et al. .................... | 423/121 |
| 4,483,830 | 11/1984 | Cresswell et al. .................... | 423/121 |
| 4,518,571 | 5/1985 | Kaluzhsky et al. .................... | 423/122 |

FOREIGN PATENT DOCUMENTS

| | | | |
|---|---|---|---|
| 1047230 | 1/1979 | Canada .................... | 423/121 |
| 3501350 | 5/1993 | Germany . | |
| 510974 | 8/1988 | U.S.S.R. .................... | 423/121 |

*Primary Examiner*—Steven Bos
*Attorney, Agent, or Firm*—Oblon, Spivak, McClelland, Maier & Neustadt, P.C.

[57] ABSTRACT

A process for eliminating iron from supersaturated sodium aluminate solutions obtained from the alkaline attack according to the Bayer process of the monohydrate bauxite including successively the steps of grinding and eventually of desilicatation in the presence of an aliquot of decomposed liquor, then attack at a temperature higher than 200° C., usually between 240° and 270° C., of the said crushed and eventually desilicatated bauxite by the remaining fraction of the decomposed liquor, to make the alumina hydrate soluble and to form at the end of the attack an insoluble suspension of the residue or red mud in the supersaturated sodium aluminate liquor which, after cooling and dilution, is decanted to separate the mud or insoluble residues from the supersaturated liquor destined to be decomposed in the presence of seeds after filtration, characterized by the fact that at the end of the attack, during the cooling of the suspension achieved by decreasing the pressure in the reactors, one injects in the said suspension at a temperature higher than 140° C. a small quantity of a mixture containing calcium.

17 Claims, 1 Drawing Sheet

PROCESS FOR REMOVING IRON IN SODIUM ALUMINATE LIQUORS OBTAINED FROM ALKALINE ATTACK OF BAUXITE CONTAINING ALUMINA MONOHYDRATE

BACKGROUND OF THE INVENTION

1. Field of the Invention

The invention relates to an iron removal procedure in the supersaturated sodium aluminate liquors obtained from alkaline attack according to the Bayer procedure of bauxite containing alumina monohydrate.

2. Description of the Background

The Bayer procedure widely described in the specialized literature constitutes the essential production technique used in the production of alumina intended to be transformed into aluminum by ignited electrolysis or to be used in the hydrate state, as transition alumina, charred alumina, sintered or melted alumina, in the numerous applications concerning the technical field of alumina.

According to that procedure, the bauxite is treated under heat with an aqueous solution of sodium hydroxide of suitable concentration or attacking liquor, thus making the alumina soluble and obtaining a sodium aluminate supersaturated solution.

After separation of the solid phase containing the untouched ore residue (red mud), the sodium aluminate supersaturated solution is seeded with particles of alumina trihydrate in order to induce the precipitation of alumina as alumina trihydrate. The sodium aluminate liquor which is now poor in alumina and which is called a decomposed liquor, is recycled in the attacking liquor step after having been concentrated and eventually recharged with sodium hydroxide to make the new attacking liquor.

It is known to one of ordinary skill in the art that the treatment conditions have to be changed according to the degree of hydration and to the crystallographic structure of the alumina as well as the nature and the content of the impurities found in the bauxite. That is why bauxite containing alumina in the monohydrate state (bohemite, diaspore) is treated at a temperature higher than 200° C. and generally between 220° C. and 300° C., with extraction yields of soluble alumina exceeding 95%. The use of an attacking solution with high concentration of sodium hydroxide, usually between 130 and 180 g of $Na_2O$/liter, allows the soluble alumina to dissolve rapidly in a low volume of liquor. This translates into a high productivity of the supersaturated liquor, that is to say a production capacity after precipitation with seeds and cooling, of at least 80 kg of alumina per $m^3$ of supersaturated liquor. This productivity is usually measured by the product of the sodium hydroxide concentration, C, expressed in g of $Na_2O$/liter with the variation $\Delta Rp$ of the ratio Rp of soluble $Al_2O_3$ concentration in g/liter/$Na_2O$ g/liter between the beginning of the decomposition (with preferably $1<Rp<1.25$) and the end of the decomposition (with preferably $0.5<Rp<0.7$).

Consequently, those relatively harsh conditions make certain impurities soluble, and, in particular, the iron present in the bauxite in oxidized forms such as hematite, goethite and even magnetite and ilmenite. This iron can be made partially soluble following unexplained pathways by forming soluble complexes such as the ferrate ion $Fe(OH)_4^-$ but it can also be precipitated in the colloidal state as very fine hydroxide particles (0.1 to 3 micrometers) which cannot be stopped by filtration, thus polluting the supersaturated sodium alumina liquor as well as the alumina trihydrate precipitated during the decomposition of the liquor.

Among the known procedure to eliminate the iron from the Bayer liquors, few of them bring a satisfactory solution to the problem of contamination of the alumina by the iron contained in the bauxite, especially if one wants to achieve an iron content in $Al_2O_3$ in the alumina trihydrate state of less than 0.01%, considered today as the maximal admissible content for most of the alumina applications and specially in the field of technical alumina. On the practical side this implies for one of ordinary skill in the art that the iron content in the supersaturated aluminate liquor should be less than 10 mg Fe per liter.

A first category of procedures uses filtration techniques of the supersaturated liquor before the more selective decomposition but these procedures are almost impossible to implement in industry, such as filtration on sand or bauxite beds according to U.S. Pat. No. 3,792,542 and U.S. Pat. Nos. 3,728,432 or on special paper filter such as in U.S. Pat. No. 4,446,177.

Other methods more easily implemented in industry use additives which facilitate the agglomeration of colloidal iron and silica hydroxide particles and then the decantation and filtration of the red mud. Among these additives there are the synthetic flocculating agents such as the anionic polyelectrolytes with high molecular weights made generally of polyacrylates and introduced preferably at the beginning of the decantation step (U.S. Pat. No. 3,390,959, U.S. Pat. No. 3,681,012 or U.S. Pat. No. 3,975,396).

One has to talk also about mineral additives such as lime. This one is often used as an additive before the alkaline attack of the bauxite to make soluble the small quantities of sodium and alumina combined originally in the bauxite as salts or complex insoluble oxides with impurities such as silica and iron, titanium or vanadium oxides.

The lime can also be introduced before the decantation of the suspension obtained from the alkaline attack at high temperature of the bauxite and cooling to near 100° C. by reducing the pressure until atmospheric pressure is reached. This is done to speed up the decantation of the red mud and to facilitate the separation of certain impurities such as the iron. That is what U.S. Pat. No. 3,796,789 recommends in order to lower to less than 10 mg per liter the iron content of the sodium aluminate liquors, especially those coming from the lixiviation of the sintered mixture of sodium carbonate and insoluble residues coming from a first alkaline attack of the bauxite (sinter process). This document doesn't specify, however, the "de-ironization" performances that can be achieved in a liquor directly obtained from the alkaline attack of the bauxite which is still the major problem to solve.

During those different experiments, the applicant can realize that the methods using those different additives sometimes allows the iron content of the supersaturated liquor from the alkaline attack of the bauxite to be lowered appreciably, but in any case, the method doesn't guarantee a content lower than 10 mg of iron per liter, whatever the origin of the bauxite is.

This result is attained however with procedures recommending at least one specific and complementary elimination step of the impurities present as colloidal hydroxide or the more or less soluble meta-stable complexes, such as iron. Thus, U.S. Pat. No. 3,607,140 and EP 0231715 (equivalent to U.S. Pat. No. 4,732,742) realize before decomposition a pre-decomposition of the supersaturated liquor in the presence of a very small quantity of seeds during which the impurities, and especially the iron, coprecipitate with the fraction of alumina trihydrate which is sacrificed as an impurity trap. Although efficient, those procedures increase production costs by slightly decreasing the productivity of the liquor and by increasing the time spent in the decomposition process lines.

For one of ordinary skill in the art, the achievement of a procedure eliminating the iron in the supersaturated sodium aluminate liquor before decomposition to a content of less than 10 mg of Fe per liter without changing the economical conditions of production, and notably productivity of the liquor and the yield of the extraction of soluble alumina, remains a priority.

SUMMARY OF THE INVENTION

The invention is based on the observation that an injection of lime made at the end of the bauxite attack at high temperature, precisely at the beginning of the cooling of the suspension which is done by progressively decreasing the pressure in the reactor, is a lot more efficient lowering the iron content in the supersaturated liquor than any of the other types of additives, and, in particular, the additives of lime before attack or after attack in the cooled suspension after depressurization to atmospheric pressure.

More precisely, the invention relates to a process for eliminating iron from the supersaturated sodium aluminate solutions obtained from the alkaline attack of the monohydrate bauxite according to the Bayer process successively including the steps of grinding and eventually desilicatating in the presence of an aliquot of decomposed liquor, then attacking at a temperature higher than 200° C., usually between 240° and 270° C., the said crushed and eventually desilicated bauxite by the remaining fraction of the decomposed liquor, to make the alumina hydrate soluble and to form at the end of the attack an insoluble suspension of the residue or red mud in the supersaturated sodium aluminate liquor which, after cooling and dilution, is decanted to separate the mud or insoluble residues from the supersaturated liquor destined to be decomposed in the presence of seeds after filtration, characterized by the fact that at the end of the attack, during the cooling of the suspension achieved by decreasing the pressure in the reactors, one injects in the said suspension, at a temperature higher than 140° C., a small quantity of a mixture containing calcium.

The temperature of the suspension during the injection of the mixture containing calcium has to be preferably between 170° and 220° C.

By mixture containing calcium, one has to include, other than the lime, calcium salts such as calcium carbonate or calcium sulfate, but also products formed by extinction of lime in an alkaline aluminate liquor, such as, for example, the tricalcic hexahydrated aluminate $Al_2O_3 \cdot 3CaO \cdot 6H_2O$. The small quantities of calcium based mixture, expressed in weight of CaO compared to the weight of the dry bauxite attacked, are between 0.5 and 3% and preferably between 1 and 2%.

To speed up the loss of solubility and the precipitation of the iron, the attack of the crushed and eventually desilicated bauxite is done with a small part of the decanted mud recycled at the beginning of the procedure. This small part of the decanted mud measured by weight ratio of the dry mud to the dry bauxite is at least of 5% and is preferably between 10 and 18%.

To increase the extraction yield of the soluble alumina, one introduces in the bauxite before attack and preferably at the grinding step, a small quantity of lime, this small quantity being limited to 1 or 2% in weight of CaO compared to the dry bauxite weight.

DESCRIPTION OF THE PREFERRED EMBODIMENTS

It is surprising that according to when the treatment of the monohydrate bauxite with the calcium injection is done, using generally lime, one obtains various results notably concerning the loss of solubility and the precipitation of the iron.

Thus, when the lime is injected in the suspension formed by the crushed ore and the attacking liquor of sodium aluminate of Rp between 0.5 and 0.7 and of sodium hydroxide concentration between 130 and 200 g $Na_2O$/liter before attack, preferably during the grinding in liquid media, even during desilication, one can register a noticeably increase in the extraction yield of the soluble alumina. This increase is notably explained by the activation of the transformation of the goethite into hematite in the presence of lime with liberation of alumina that was incorporated in the crystalline array of the goethite. A weight ratio of 3 to 6% of CaO compared to the weight of the dry bauxite is usually used, but it is a function of the nature and the mineral structure of the impurities present in the monohydrate bauxite. It also is to be noted that an excess of lime induces a decrease in the yield by reacting with the sodium aluminate and precipitating the insoluble tricalcique aluminate.

Thus, according to Table 1 which follows, one can notice with African monohydrate bauxite (Boke) an increase in yield of 4 to 5%, without noticing a markedly lower iron content in the supersaturated sodium aluminate liquor decanted and filtered before decomposition.

Considering that the stopping threshold of particles containing iron is of the order of 3 micrometers, one keeps concentrations of 15 to 25 mg Fe/liter which is too high for the production of good quality alumina.

TABLE 1

| Trial number | CaO/ Bauxite weight % before attack | CaO/ Bauxite weight % end of attack | CaO/ Bauxite weight % before decantation | Iron mg/l supersaturated liquor | % Yield soluble $Al_2O_2$ |
| --- | --- | --- | --- | --- | --- |
| 1 | 0 | 0 | 0 | 15 to 25 | 91 to 93 |
| 2 | 3 | 0 | 0 | 15 to 25 | 95 to 96 |
| 3 | 5 | 0 | 0 | 15 to 20 | 96 to 97 |
| 4 | 8 | 0 | 0 | 15 to 20 | 94 to 95 |
| 5 | 2 | 1 | 0 | 8 to 10 | 96 to 97 |
| 6 | 1 | 2 | 0 | 7 to 9 | 95 to 96 |
| 7 | 0 | 3 | 0 | 8 to 10 | 92 to 94 |
| 8 | 0 | 0 | 3 | 13 to 18 | 91 to 93 |
| 9 | 1 | 0 | 2 | 15 to 20 | 92 to 94 |
| 10 | 2 | 0 | 1 | 15 to 20 | 95 to 96 |

Injection temperature: 180° C.
Contact time at 180° C.: 30 min

One can notice on the other hand that a small addition of CaO, on the order of 1 to 2% in weight compared to the dry bauxite, done at the end of the attack during the reactors depressurization into the suspension at a temperature between 140° C. and 240° C., but preferably between 170° C. and 220° C., allows the soluble iron content or the one in a colloidal state in the liquor to be lowered to less than 10 mg/l. One has to notice that in the meantime, the yields are not lowered if the amount of lime added at the beginning of the attack is only 1 to 2%, which limits the total consumption of lime to a maximum of 3 to 4% for an equivalent extraction yield and much better removal of the iron, in the order of 10 mg/l. In industry those results are very interesting because they allow the effect of the lime to be double by adjusting separately the yield of the attack with the lime introduced before the attack itself and also the residual iron content with the lime added during depressurization.

During the trials, the applicant could see that the best results were obtained when the addition of lime was done between 170° and 220° C., in fact, above 220° C. no improvement in iron removal is noticed and there is even no degradation above 240° C. whereas below 170° C. and specially 140° C. the degradation is very fast. As the trials in which the lime addition was done around 100° C. show, the suspension being at atmospheric pressure before it is transferred into the decanters, there is almost no iron removal.

In order to systematically achieve an iron content of less than 10 mg/l in the liquor before decomposition, it is necessary to inject 1 to 2% CaO (see Table 1) at depressurization and at a temperature between 170° and 220° C., to maintain contact at this temperature during a long enough time between the lime or the mixture containing the calcium and the suspension, that is to say at least 15 minutes and preferably 20 to 40 minutes.

In industry this operation requires a prolonged and delicate control of the pressure regulators in the reactors at the end of the attack and increases the total length of time spent in the attacking chain.

For this reason an essential goal was to reduce the time spent in the chain.

A first series of trials was done in order to make the lime base mixture the most active possible, that is to say to optimize its characteristics and notably its fineness and the dispersion of the lime based particles in suspension in the liquor injected in the regulators.

3 possible lime sources were studied

* crude, sifted quick lime<2 mm
* ground and sifted quick lime<200 micrometers
* calcium carbonate<2 mm (weight calculated in CaO equivalent)

4 carrier liquids were combined to them

* hot attacking liquor (temperature of 60° to 70° C.)
* room temperature attacking liquor
* Back flow water wash of the mud heated to 60° C.
* Back flow water wash of the mud at room temperature It turns out that the performances of the different types of lime charged at approximately 100 g CaO/liter are similar and that the particle size in the quick lime as well as in the calcium carbonate is not to important as long as the refinement of the particle size in suspension from attrition due to stirring is sufficient, that is to say in the present case that less than 30% by weight of the particles in suspension are less than 20 micrometers.

One of ordinary skill in the art will choose, in order to minimize the transformations necessary to implement this process in industry, the extinction of the crude lime sifted to only 2 mm in the attacking liquor at 60° to 70° C.

On the other hand, because no notable decrease in the time spent in the reactor was obtained, a second series of trials was done in order to activate the iron precipitation by seeding, done by combining the injection of lime at depressurization and the recycling at the beginning of the attack of a small fraction of the decanted mud with the crushed and desilicated bauxite.

During previous trials, the applicant was able to notice that the recycling of part of the decanted mud favors the later separation of the liquor from the mud, notably during decantation, but doesn't allow the iron content in the filtered liquor which is still higher than 10 mg/liter to be significantly lowered.

On the other hand, a very significant decrease in iron content is noted as soon as the lime injection during depressurization according to the invention is coupled with the partial recycling of the mud as shown in Table 2 which follows. Moreover, this decrease in residual iron content goes with an important reduction of the time the calcium containing compound has to spent in the reactor, going from 30 minutes in average down to 5 or 6 minutes.

TABLE 2

| Trial number | CaO bauxite weight % end of attack depressurization | Time CaO spent in reactor in minutes | % recycled mud/ bauxite weight % | Fe content super-saturated liquor |
| --- | --- | --- | --- | --- |
| 11 | 0 | | 10 | 13 to 18 |
| 12 | 0 | | 15 | 12 to 15 |
| 13 | 0 | | 20 | 12 to 15 |
| 14 | 1 | 30 | 0 | 8 to 10 |
| 15 | 1 | 4 | 0 | 12 to 15 |
| 16 | 1 | 10 | 5 | 9 to 11 |
| 17 | 1 | 6 | 10 | 8 to 10 |
| 18 | 1 | 6 | 15 | 7 to 9 |
| 19 | 1 | 3 | 20 | 7 to 9 |

*CaO injection done at 180° C.

Thus, the seeding effect of the mud coupled to the addition of lime during depressurization activates the iron precipitation and allows the time spent in the reactor to be reduced to 10 minutes and even 3 minutes for recycling rates of the mud going from 5 to 20%. For recycling rates higher than 20%, the kinetic of the iron's precipitation is not increased any more and the loss of bauxite treatment capacity becomes a significant factor in industrial production.

In the same manner as before, the yields obtained by lime injection before attack, at grinding for example, are kept when the lime injection at depressurization is coupled with partial recycling of the mud in the attack phase as shown in Table 3 following.

TABLE 3

| Trial number before | CaO/ Bauxite weight % end of attack | CaO/ Bauxite weight % % bauxite attack depressurization | % recycled mud/ weight liquor | Iron mg/liter super-saturated | % Yield Al$_2$O$_2$ |
| --- | --- | --- | --- | --- | --- |
| 20 | 2 | 0 | 0 | 15 to 25 | 96 to 97 |
| 21 | 2 | 1 | 0 | 12 to 15 | 96 to 97 |
| 22 | 2 | 1 | 5 | 10 to 12 | 96 to 97 |
| 23 | 1 | 1 | 10 | 8 to 10 | 95 to 96 |
| 24 | 2 | 1.5 | 10 | 7 to 9 | 96 to 97 |
| 25 | 1.5 | 1.5 | 12 | 7 to 9 | 96 to 97 |
| 26 | 1 | 1 | 18 | 7 to 9 | 95 to 96 |
| 27 | 2 | 0.5 | 20 | 9 to 11 | 96 to 97 |

*Lime injection temperature at depressurization: 200° C.
Time spent in the reactor: 6 minutes

BRIEF DESCRIPTION OF THE DRAWING

The invention will be better understood with a detailed description of the preferred industrial implementation conditions, referring to FIG. 1 which represents the different treatment steps of the bauxite monohydrate.

IMPLEMENTATION EXAMPLE

Figure 1:
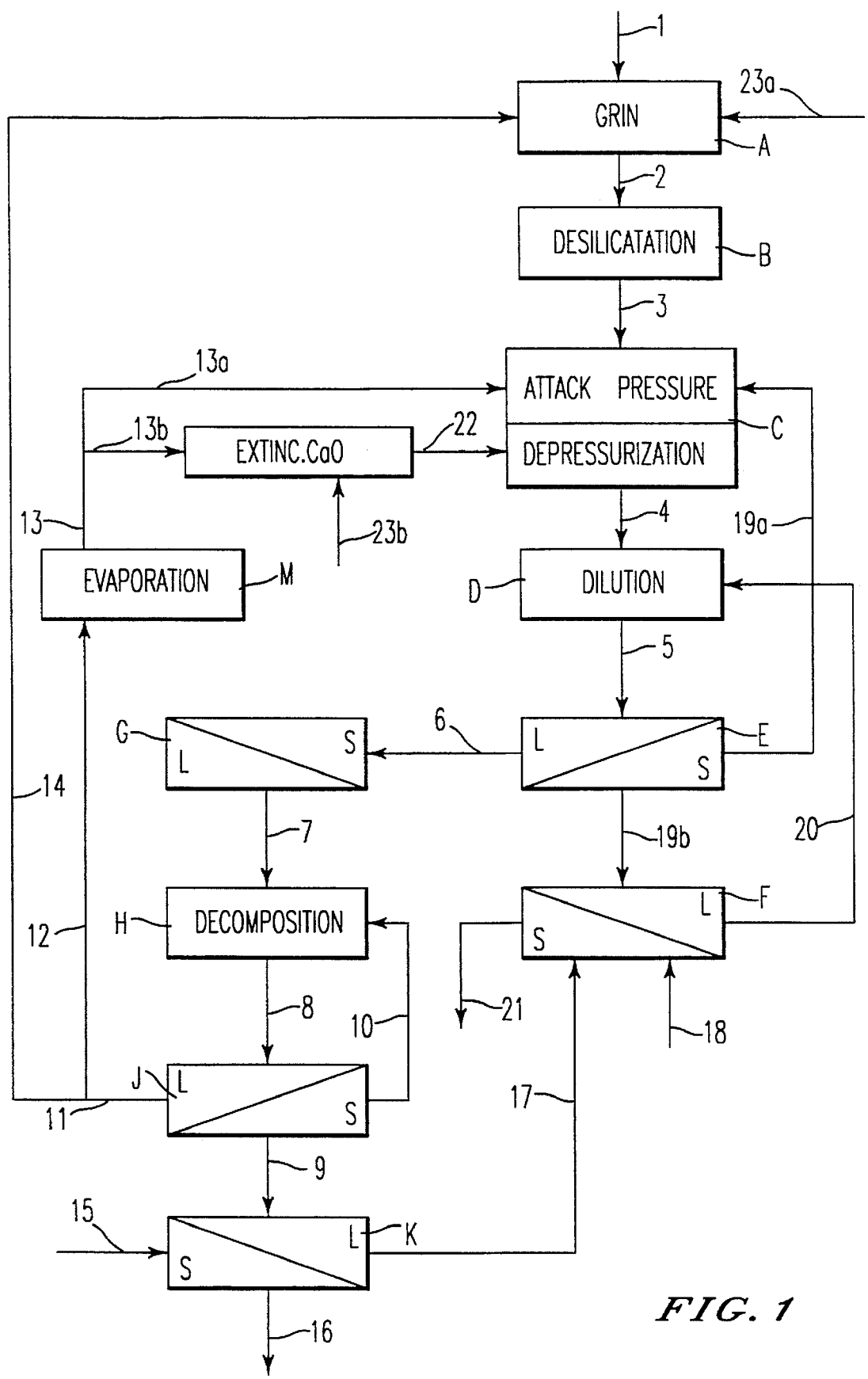

According to FIG. 1, the monohydrate bauxite (boehmite or diaspore) is placed in contact with an aliquot 14 of sodium aluminate decomposed liquor 11, with $R_p$ between 0.57 and 0.65 and the sodium hydroxide concentration is between 150 and 160 g $Na_2O$/liter with 1600 to 1800 kg of ore to be treated per $m^3$ of liquor. Simultaneously, an addition of quick lime sifted at 2 mm and corresponding to 1 to 2% of the dry bauxite weight is added to the mixture which after a humid grinding A forms a thick suspension 2 which undergoes, if necessary, a desilication treatment by heating between 90° C. and 105° C. during a long enough time, usually between 5 and 10 hours in order to make soluble the reactive silica contained in the bauxite as sodium silico-aluminate. Suspension 3 coming from the desilication step is placed in contact with an aliquot 13a of the attacking liquor 13 with $R_p$ between 0.57 and 0.65 and which sodium hydroxide concentration is between 195 and 215 g $Na_2O$/liter as well as with a fraction 19a of the decanted mud preferably comprised at the dry stage between 10 and 18% of the dry bauxite weight. The mixture thus obtained is heated in the reactor between 240° and 270° C. for at least 30 minutes and preferably for 1 to 2 hours before the beginning of the cooling is done by progressively lowering the pressure in the reactor. When the temperature is between 220° and 170° C., an injection is made in the regulators, using for example a high pressure volumetric pump, of lime water 22 with a concentration in CaO preferably of 80 and 120 g/liter and corresponding to 1 to 2% of the initial dry bauxite weight.

It is to be noted that this lime water is obtained by suspension of a substance containing calcium 23b, preferably quick lime or calcium carbonate, in an aliquot 13b of the attacking liquor 13 and during a long enough stirring time (2 to 20 hours) to obtain an efficient grinding of the suspended particles, that is to say less than 30% in weight of particles>20 micrometers.

The lime water 22 injected into the regulators is mixed with the suspension maintained in the 170°–220° C. temperature range for about 6 minutes, the resulting suspension 4 is then cooled to 105° C. and placed under atmospheric pressure. Using liquor 20 coming from the back steam wash, F, of the mud and containing less than 100 g $Na_2O$/liter, the suspension 4 is diluted, D, in order to lower its sodium hydroxide concentration to a range more suitable to obtain good results in the following decantation, E, and decomposition, H, procedures.

Thus, suspension 5, coming from the dilution step, D, with a temperature between 90° C. and 105° C. an $R_p$ between 1.135 and 1.25 and a sodium hydroxide concentration between 150 and 160 g $Na_2O$/liter, is placed in decantation, E, to separate, using the known method, the red mud, of which a minor portion 19a is recycled at the attack stage, C, and the remaining portion goes to the waste 21 after successive back flow washes using the water wash 17 of the alumina trihydrate production 16 and pure water 18.

Liquor 6 from decantation, with an $R_p$ staying between 1.13 and 1.23, undergoes a safety filtration, G, in order to eliminate the fine mud particles still in suspension. The clear supersaturated sodium aluminate liquor filtrate 7 is decomposed, H, with some trihydrate seeds 10 recycled according to the prior art. The alumina trihydrate in suspension 8 in the decomposed liquor is separated by filtration, J, to be for the most part (around 90% weight) recycled for seeding 10 and for the remaining part 9 (around 10%) extracted for production 16 after water 15 wash, K. After removal of an aliquot 14 used in the humid grinding and the potential desilication of the bauxite, the remainder 12 of the decomposed sodium aluminate filtrate 11, with $R_p$ between 0.57 and 0.65 and with sodium hydroxide concentration between 150 and 160 g $Na_2O$/liter, is concentrated by evaporation, M, to constitute the attacking liquor 13 of the ground and desilicated bauxite, the characteristics of which have already been clarified.

PROCESS ADVANTAGES

According to the present invention, after the safety filtration step, G, one obtains a supersaturated sodium aluminate liquor 7 with an iron content that is systematically less than 10 mg/liter and usually between 7 and 9 mg/liter, regardless of the origin of the monohydrate bauxite to be treated. The corresponding iron contents for the production alumina trihydrate 16, precipitated by decomposition, H, with seeds 10 from liquor 7, are between 30 and 80 ppm $Fe/Al_2O_3$, after the wash K, therefore systematically lower than the maximum limit of 0.01%.

With an $R_p$ range before decomposition of liquor 7 between 1.13 and 1.23 for a sodium hydroxide concentration of the order of 150 g $Na_2O$/liter and an $R_p$ range after decomposition and filtration of liquor 11 between 0.57 and 0.65 for a sodium hydroxide concentration of the order of 150 g $Na_2O$/liter, the liquor's productivity is kept higher than 80 kg $Al_2O_3/m^3$.

The same thing happens for the extraction yield of the soluble alumina which stays between 95 and 97%, which is equivalent to the yields obtained with a single, larger lime addition before attack (3 to 7% CaO % dry bauxite compared to the two different additions of the present invention which total doesn't exceed 3%) which does not in any case solve the iron removal problem.

What is claimed:

1. A process for reducing iron content of Bayer process liquors, comprising the following steps in the order shown:
    a) grinding monohydrate bauxite;
    b) desilicating the ground bauxite with an aliquot of decomposed liquor;
    c) digesting with remaining alkaline decomposed liquor the desilicated and ground bauxite at a temperature higher than 200° C. in a reactor, to form a suspension comprising insoluble residue or red mud in a supersaturated sodium aluminate liquor;
    d) cooling the suspension by decreasing pressure in the reactor;
    e) cooling, diluting, and decanting the suspension to separate the insoluble residue or red mud from the supersaturated sodium aluminate liquor; and
    f) filtering the separated supersaturated sodium aluminate liquor and then decomposing the liquor in the presence of seeds to form decomposed liquor,
    wherein during cooling of the suspension by decreasing pressure in the reactor, a calcium containing compound selected from the group consisting of lime and calcium salts is injected into the suspension while the suspension is at a temperature higher than 140° C., to remove iron from the suspension.

2. Process according to claim 1, wherein the suspension temperature during injection of the calcium containing compound is between 170° C. and 220° C.

3. Process according to claim 1, wherein the calcium containing compound is lime.

4. Process according to claim 1, wherein the calcium containing compound is a calcium salt.

5. Process according to claim 1, wherein the calcium containing compound is formed by lime extinction in an alkaline aluminate liquor.

6. Process according to claim 1, wherein the quantity of calcium containing compound injected in the suspension is between 0.5 and 3% in CaO weight compared to the dry bauxite weight.

7. Process according to claim 1, wherein the bauxite digestion is done in the presence of a small fraction of the decanted insoluble residue or red mud.

8. Process according to claim 7, wherein the small fraction of decanted insoluble residue or red mud measured by the weight ratio of the dry mud to the dry bauxite is at least 5%.

9. Process according to claim 1, wherein a small quantity of lime is introduced into the bauxite before the digesting step.

10. Process according to claim 9, wherein the small quantity of lime introduced in the bauxite before the digesting step is between 1 and 2% of Cao weight compared to the dry bauxite weight.

11. Process according to claim 1, wherein the calcium containing compound stays at least 15 minutes in the suspension at a temperature between 170° C. and 220° C.

12. Process according to claim 1, wherein the calcium containing compound is injected as lime water containing 80 to 120 g CaO/liter and in which at least 30% by weight of the particles have a size larger than 20 micrometers.

13. Process according to claim 12, wherein the lime water is obtained by extinction of the crude lime sifted to 2 mm in the digesting liquor between 60° and 70° C.

14. Process according to claim 7, wherein the time spent by the calcium containing compound in the suspension does not exceed 10 minutes.

15. Process according to claim 1, wherein the decomposed sodium aluminate liquor has an $R_p$ between 0.57 and 0.65 and a sodium hydroxide concentration between 150 and 160 g $Na_2O$/liter.

16. Process according to claim 1, wherein the decomposed liquor is concentrated by evaporation and has an $R_p$ between 0.57 and 0.65 and a sodium hydroxide concentration between 195 and 215 g $Na_2O$/liter.

17. Process according to claim 1, wherein the supersaturated sodium aluminate liquor after filtration and before decomposition has a $R_p$ between 1.13 and 1.23 and a sodium hydroxide concentration between 150 and 160 g $Na_2O$/liter.

\* \* \* \* \*